United States Patent [19]

Faigle

[11] Patent Number: 5,460,406
[45] Date of Patent: Oct. 24, 1995

[54] INFLATOR ASSEMBLY

[75] Inventor: Ernst M. Faigle, Imlay City, Mich.

[73] Assignee: TRW Vehicle Safety Systems Inc., Lyndhurst, Ohio

[21] Appl. No.: 166,210

[22] Filed: Dec. 13, 1993

[51] Int. Cl.$^6$ .................................................. B60R 21/28
[52] U.S. Cl. ........................... 280/741; 280/737; 222/5; 102/530
[58] Field of Search .................................. 280/741, 740, 280/737, 736 R; 222/3, 5; 102/530, 531

[56] References Cited

U.S. PATENT DOCUMENTS

| | | | |
|---|---|---|---|
| 3,180,373 | 4/1965 | Hebenstreit | 222/5 |
| 3,232,481 | 2/1966 | Hebenstreit | 222/3 |
| 3,689,105 | 9/1972 | Matsui et al. | 222/3 X |
| 3,810,655 | 5/1974 | Pracher | 222/3 X |
| 3,822,895 | 7/1974 | Ochiai | 280/743 R |
| 5,060,973 | 10/1991 | Giovanetti | 280/736 |
| 5,236,675 | 8/1993 | Swain et al. | 280/736 X |
| 5,261,675 | 11/1993 | Brockman et al. | 280/737 |
| 5,273,312 | 12/1993 | Coultas et al. | 280/737 |

FOREIGN PATENT DOCUMENTS

4231356A1  4/1993  Germany.

*Primary Examiner*—Richard M. Camby
*Assistant Examiner*—Christopher P. Ellis
*Attorney, Agent, or Firm*—Tarolli, Sundheim & Covell

[57] ABSTRACT

An inflator assembly (10) for inflating an inflatable vehicle occupant restraint (12) includes a pressure vessel (14) with a storage chamber (18) containing a combustible mixture of gases. An ignitable material (122), when burning, ignites the combustible mixture of gases in the storage chamber (18). The storage chamber (18) has an axis (61), first and second opposite ends which are spaced from each other a distance along the axis (61), and a substantially circular cross sectional shape at all locations along the axis (61). The storage chamber (18) has a shape such that the ratio of the distance between the opposite ends of the storage chamber (18) to the greatest cross sectional diameter of the storage chamber (18) is within the range of 0.75–1.25.

13 Claims, 5 Drawing Sheets

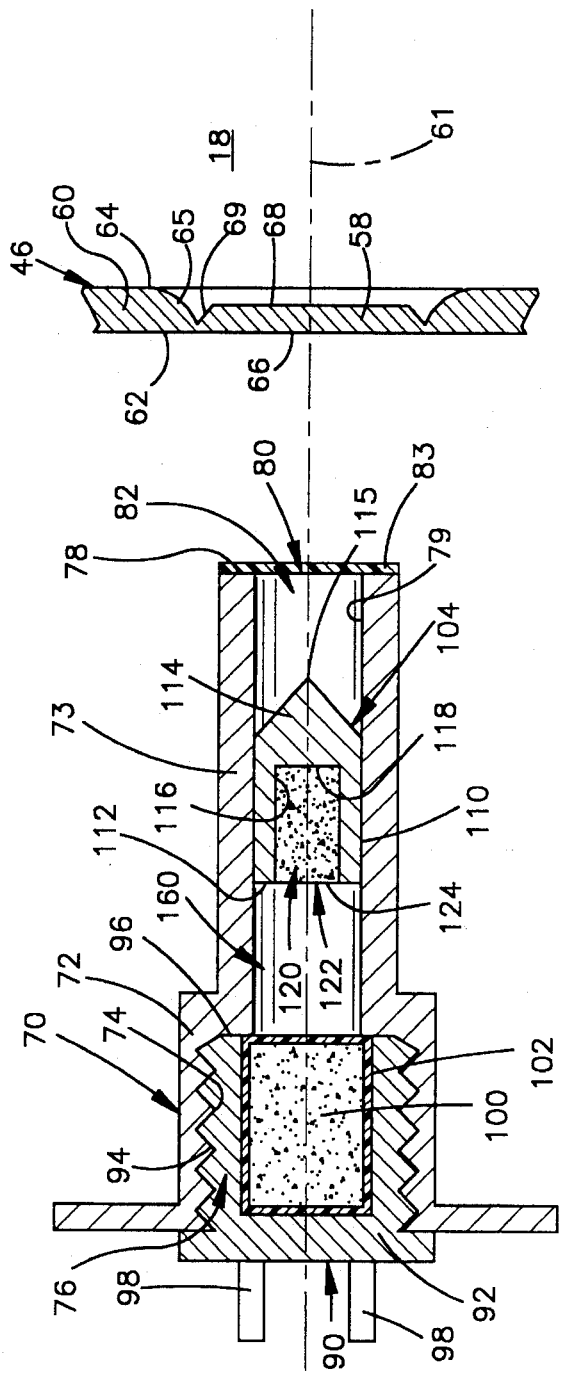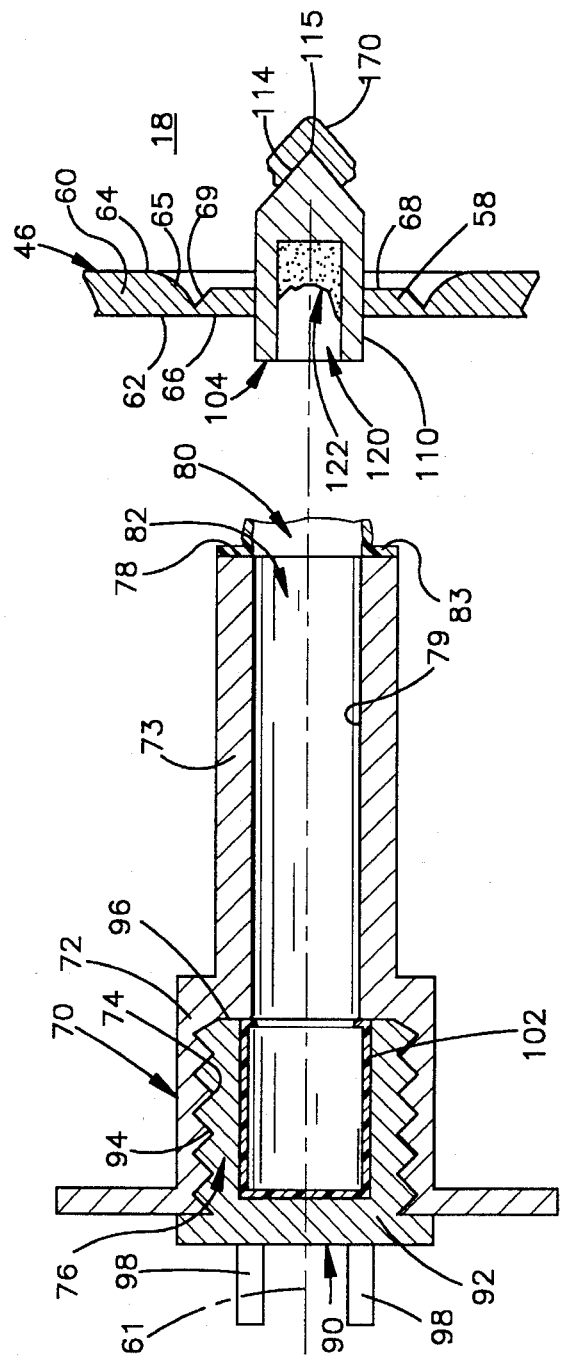

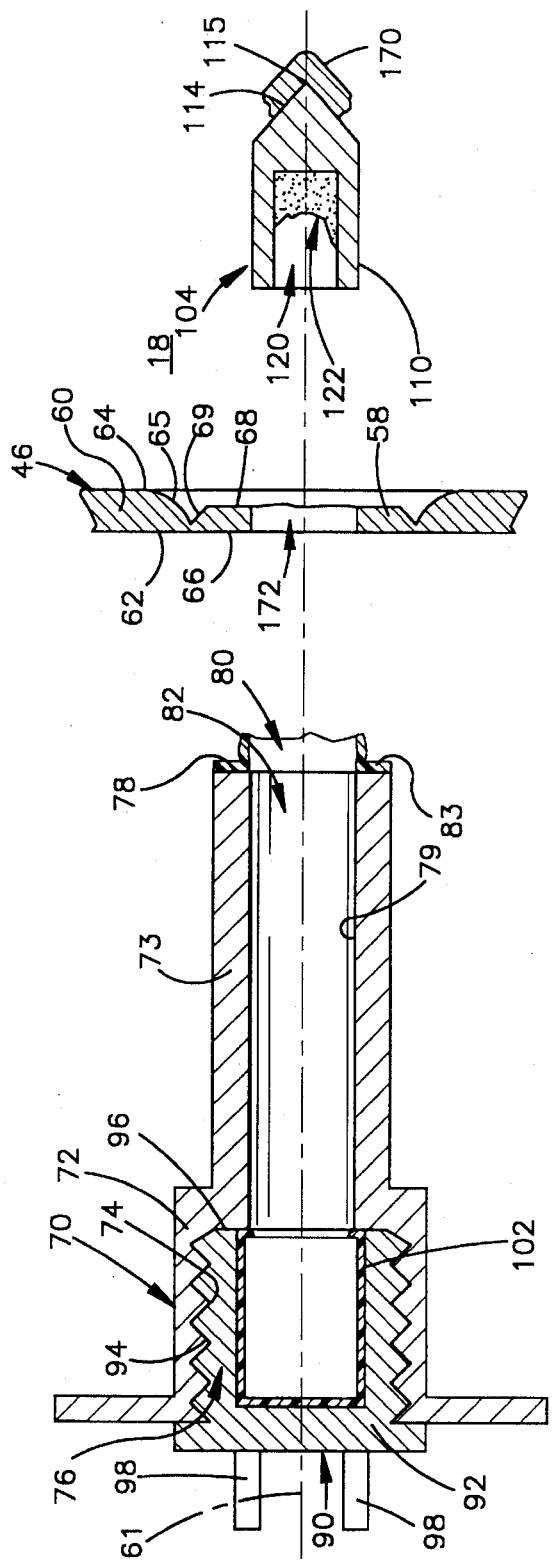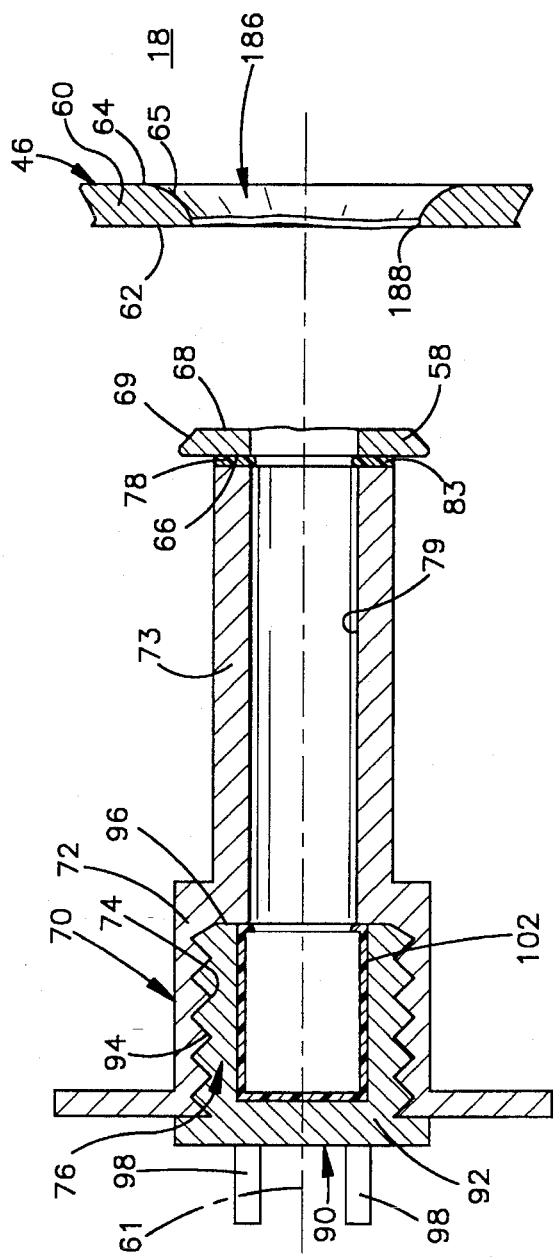
Fig.4
Fig.5

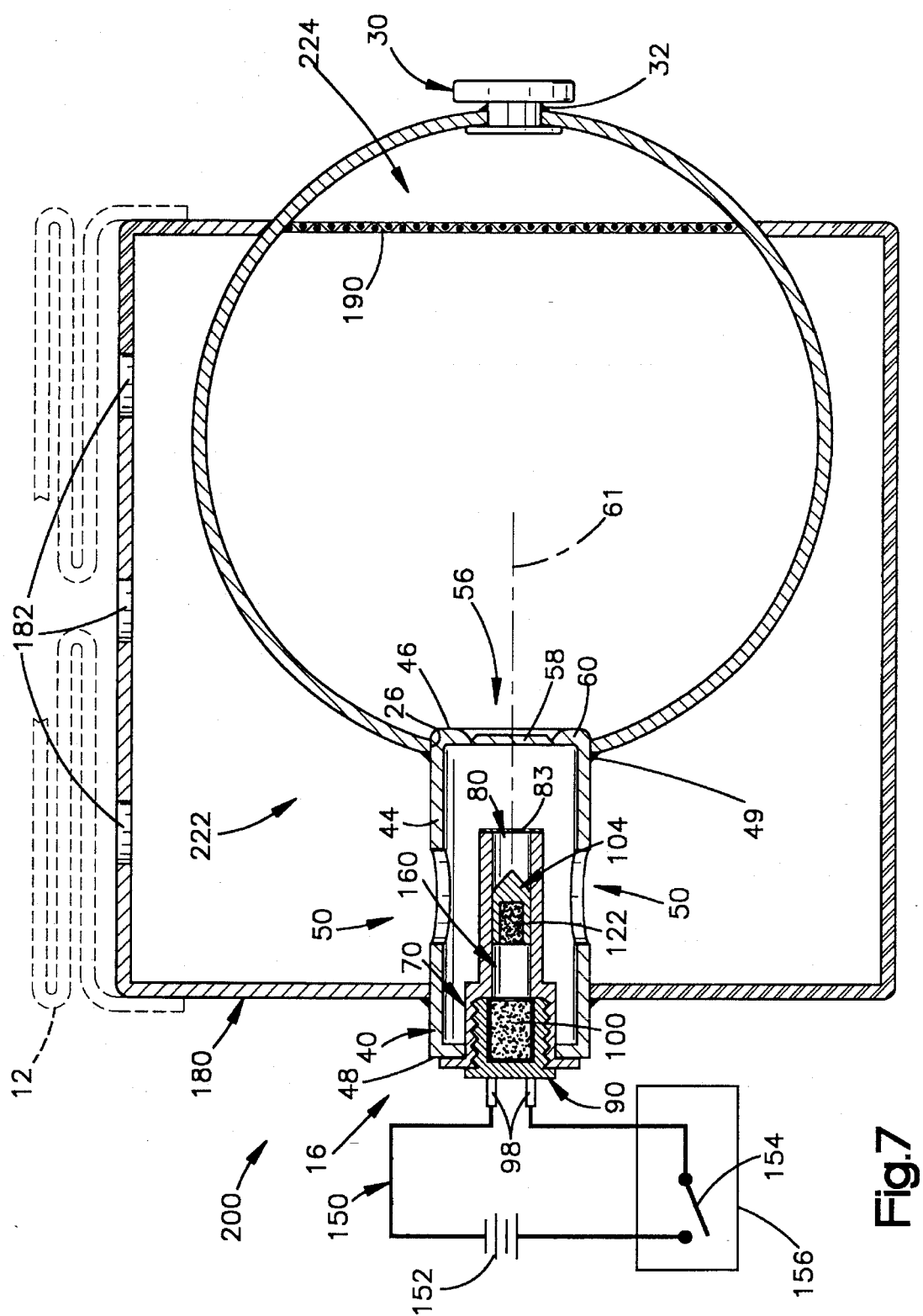

INFLATOR ASSEMBLY

FIELD OF THE INVENTION

The present invention relates to an inflator assembly for inflating an inflatable vehicle occupant restraint, such as an air bag.

BACKGROUND OF THE INVENTION

An inflator assembly for inflating an inflatable vehicle occupant restraint, such as an air bag, may include a pressure vessel which stores gas for inflating the restraint. Such an inflator assembly is disclosed in co-pending U.S. patent application Ser. No. 761,685, filed Sep. 18, 1991, now abandoned, entitled "Apparatus for Inflating a Vehicle Occupant Restraint," and assigned to TRW Vehicle Safety Systems Inc. The inflator assembly disclosed in that co-pending patent application includes a pressure vessel which contains a combustible mixture of gases. The inflator assembly is actuated to inflate the vehicle occupant restraint in response to vehicle deceleration of a magnitude which indicates the occurrence of a collision. When the inflator assembly is thus actuated, the combustible mixture of gases in the pressure vessel is ignited. The gas pressure inside the pressure vessel is then increased by the heat which results from the combustion of the mixture of gases. When the increasing gas pressure reaches a predetermined elevated level, it ruptures a burst disk to open the pressure vessel. The vehicle occupant restraint is then inflated by gas which flows outward from the pressure vessel and into the vehicle occupant restraint at an elevated pressure level.

SUMMARY OF THE INVENTION

In accordance with the present invention, an inflator assembly for inflating an inflatable vehicle occupant restraint, such as an air bag, comprises a pressure vessel means, an igniter means and a directing means. The pressure vessel means defines a storage chamber which contains a combustible mixture of gases. The igniter means increases the gas pressure in the storage chamber by igniting the combustible mixture of gases in the storage chamber. The directing means directs gas to flow from the pressure vessel means into the vehicle occupant restraint.

The storage chamber has an axis, first and second opposite ends which are spaced from each other a distance along the axis, and a substantially circular cross sectional shape at all locations along the axis. The storage chamber has a shape such that the ratio of the distance between the opposite ends of the storage chamber to the greatest cross sectional diameter of the storage chamber is within the range of 0.75–1.25.

In a first preferred embodiment of the present invention, the storage chamber has a cylindrical shape, and has a length between its opposite ends which is equal to its diameter. In a second preferred embodiment of the present invention, the storage chamber has a spherical shape. The distance between the opposite ends of the storage chamber is thus equal to the diameter of the storage chamber.

An inflator assembly constructed in accordance with the present invention inflates a vehicle occupant restraint efficiently because the shape of the storage chamber is designed to promote combustion of the mixture of gases uniformly throughout the entire volume of the storage chamber. The mixture of gases inside the storage chamber is thus heated and pressurized efficiently. As a result, the mixture of gases requires a lesser initial quantity of combustible gas, and/or a lesser initial storage pressure, to inflate the vehicle occupant restraint at a given rate.

BRIEF DESCRIPTION OF THE DRAWINGS

The foregoing and other features of the present invention will become apparent to those skilled in the art to which the present invention relates from reading the following description with reference to the accompanying drawings, in which:

FIG. 2 is an enlarged view of parts of the inflator assembly of FIG. 1;

FIG. 3 is a view similar to FIG. 2 showing parts in different positions;

FIG. 4 is a view similar to FIG. 3 showing parts in different positions;

FIG. 5 is a view similar to FIG. 4 showing parts in different positions;

FIG. 7 is a view of an inflator assembly comprising a second embodiment of the present invention, showing the inflator assembly in an unactuated condition.

DESCRIPTION OF PREFERRED EMBODIMENTS

Figure 1:
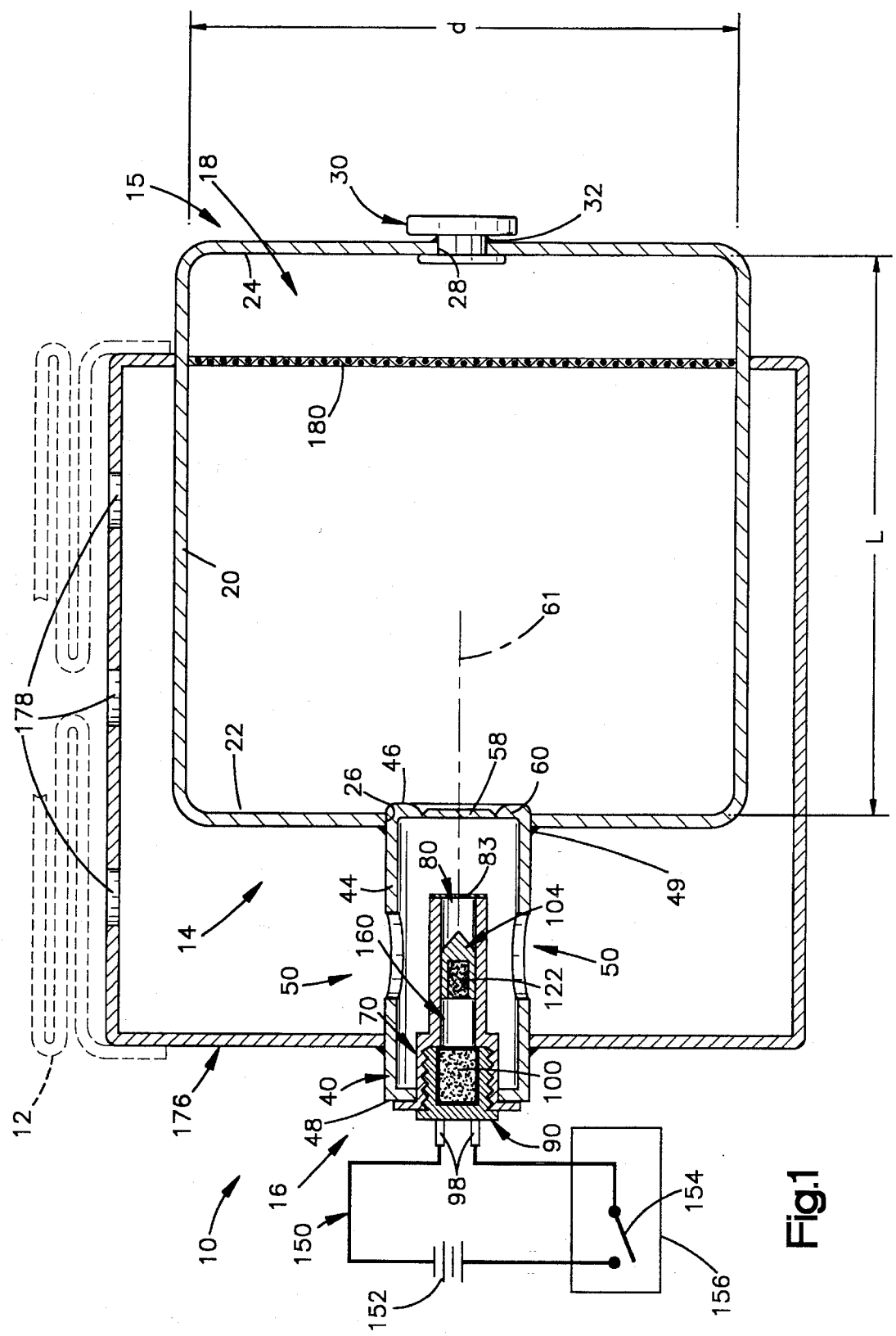
FIG. 1 is a schematic view of an inflator assembly comprising a first embodiment of the present invention, showing the inflator assembly in an unactuated condition.
Figure 6:
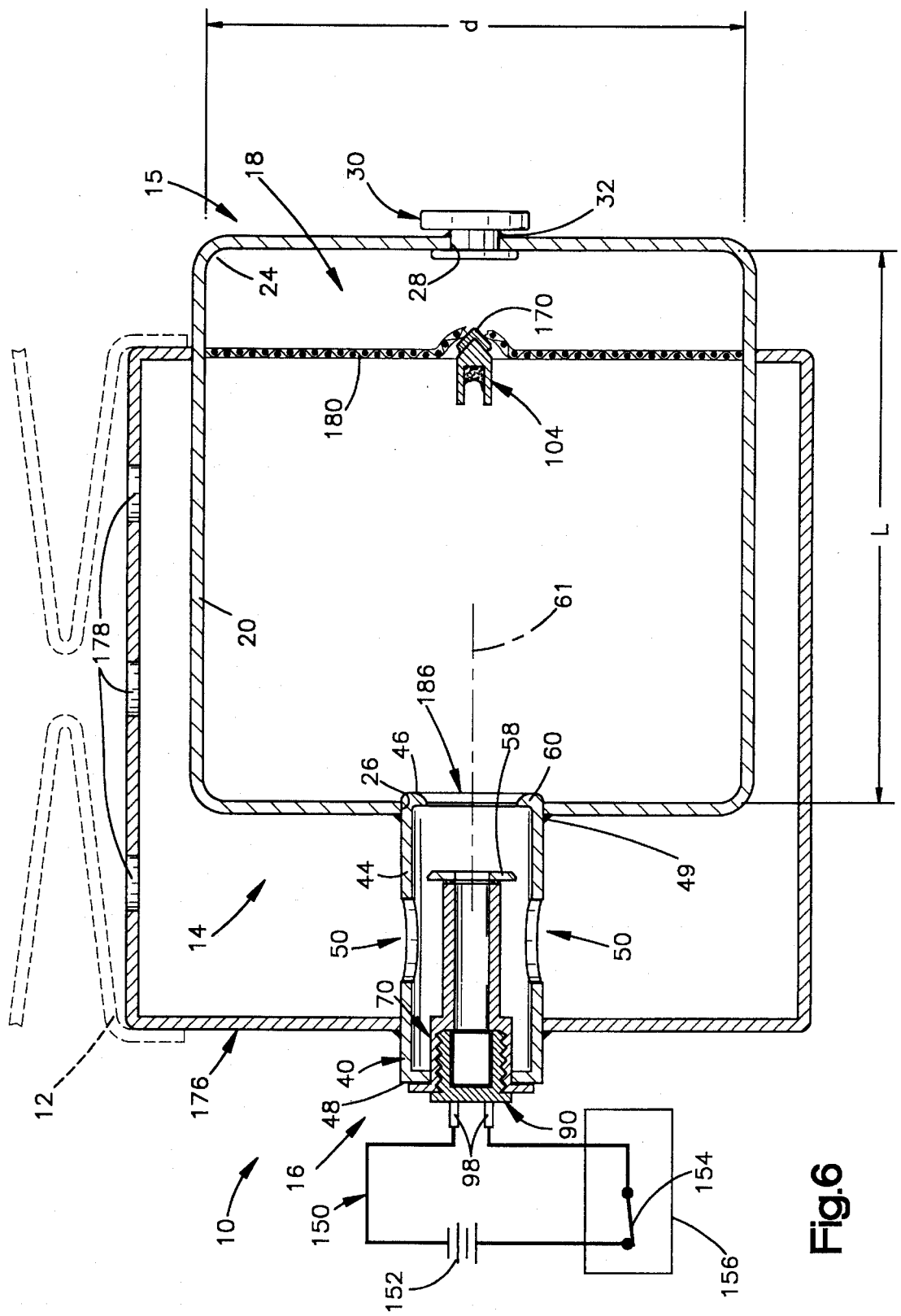
FIG. 6 is a view showing the inflator assembly of FIG. 1 in an actuated condition.

An inflator assembly 10 comprising a first embodiment of the present invention is shown schematically in FIG. 1. The inflator assembly 10 includes an inflatable vehicle occupant restraint which, in the preferred embodiments of the invention shown in the drawings, is an air bag 12. The inflator assembly 10 has an unactuated condition in which the air bag 12 is stored in a folded condition, as shown in FIG. 1. The inflator assembly 10 also has an actuated condition in which it inflates the air bag 12, as shown in FIG. 6. The inflator assembly 10 is actuated in response to vehicle deceleration of at least a predetermined magnitude which indicates the occurrence of a vehicle collision. The air bag 12 is then inflated from the stored, folded condition to an inflated condition in which it restrains movement of a vehicle occupant and protects the occupant from forcibly striking parts of the vehicle.

The inflator assembly 10 further includes a source of inflation fluid, which is preferably a pressure vessel 14. The pressure vessel 14 includes a tank member 15 and an actuator assembly 16. The tank member 15 and the actuator assembly 16 together define a sealed storage chamber 18 containing inflation fluid, such as gas, for inflating the air bag 12. The actuator assembly 16 opens the pressure vessel 14 to release the inflation fluid from the storage chamber 18 upon the occurrence of vehicle deceleration of at least the predetermined magnitude which indicates the occurrence of a vehicle collision.

The tank member 15 has a substantially cylindrical side wall portion 20, a substantially circular first end wall portion 22, and a substantially circular second end wall portion 24. The first end wall portion 22 of the tank member 15 has an annular inner edge surface 26 defining an opening extending through the first end wall portion 22. The second end wall portion 24 of the tank member 15 has an annular inner edge surface 28 which similarly defines an opening extending through the second end wall portion 24. An end cap 30 is closely received through the opening in the second end wall portion 24. A weld 32 blocks leakage of the inflation fluid from the storage chamber 18 between the edge surface 28 and the end cap 30. The end cap 30 has a passage (not shown) through which the inflation fluid is conducted into the storage chamber 18. After the storage chamber 18 is filled with inflation fluid at a desired pressure, the passage in the end cap 30 is closed. The end cap 30 may also include a conventional pressure switch (not shown) which monitors the fluid pressure in the storage chamber 18 to alert an occupant of the vehicle if the fluid pressure drops below a predetermined level.

The inflation fluid in the storage chamber 18 preferably comprises a combustible mixture of gases. The combustible mixture of gases in the storage chamber 18 includes a primary gas, which comprises the majority of the gas for inflating the air bag 12, and a combustible gas which, when ignited, heats the primary gas. The mixture of gases is in a homogeneous gaseous state. The primary gas preferably includes an oxidizer gas for supporting combustion of the combustible gas and an inert gas for inflating the air bag 12. The primary gas may include air or an inert gas or a mixture of air and an inert gas. The inert gas may be nitrogen, argon or a mixture of nitrogen and argon. Preferably, the primary gas is air and the oxidizer gas is the oxygen in the air. The combustible gas may be hydrogen, methane or a mixture of hydrogen and methane. Preferably, the combustible gas is hydrogen. A typical composition of the mixture of gases is about 12% by volume hydrogen and 88% by volume air. The mixture of gases is stored in the storage chamber 18 at a pressure of approximately 2,500 psi, but could be stored in the storage chamber 18 at a different pressure.

The actuator assembly 16 includes a manifold 40. The manifold 40 has a substantially cylindrical side wall 44, a substantially circular closure wall 46 at one end of the side wall 44, and a substantially circular outer wall 48 at the other end of the side wall 44. The side wall 44 of the manifold 40 is closely received in the opening in the first end wall portion 22 of the tank member 15. A weld 49 blocks leakage of the gas from the storage chamber 18 between the edge surface 26 and the side wall 44. A plurality of gas flow openings 50 extend through the side wall 44.

The closure wall 46 has a predefined central break away portion 58 and an annular rim portion 60, both of which are centered on an axis 61. As shown in enlarged detail in FIG. 2, the rim portion 60 has an outer side surface 62, and has an inner side surface 64 with an annular edge 65 circumscribing the break away portion 58. The break away portion 58 has an outer side surface 66, and has an inner side surface 68 with a circular peripheral edge 69 adjoining the annular edge 65 of the rim portion 60. The edges 65 and 69 converge to define a stress riser in the material of the closure wall 46 which interconnects the break away portion 58 with the rim portion 60. The juncture of the edges 65 and 69 thus defines a ring-shaped boundary at which the break away portion 58 of the closure wall 46 may break away from the rim portion 60.

When the storage chamber 18 is filled with a mixture of gases as described above, the pressure of the stored mixture of gases acts axially outward against the inner side surface 68 of the break away portion 58 of the closure wall 46. The ambient air pressure simultaneously acts axially inward against the outer side surface 66 of the break away portion 58. As a result, the break away portion 58 is subjected to a gas pressure differential between the pressure of the stored mixture of gases and the ambient air pressure. Since the pressure of the stored mixture of gases is higher than the ambient air pressure, the gas pressure differential results in a pressure force urging the break away portion 58 to move axially outward. The material of the closure wall 46 which comprises the stress riser interconnecting the break away portion 58 with the rim portion 60 is designed to rupture under the stress induced by the pressure force acting axially outward when the pressure force reaches a predetermined elevated level.

An actuator housing 70 is supported in the manifold 40. The actuator housing 70 is a tubular member centered on the axis 61. As shown in enlarged detail in FIG. 2, the actuator housing 70 has a base portion 72 and a guide portion 73. The base portion 72 has a threaded inner surface 74 which defines a cylindrical base compartment 76. The guide portion 73 has an annular end surface 78 and a smooth cylindrical inner surface 79. The annular end surface 78 defines a circular opening 80. The cylindrical inner surface 79 defines a guide passage 82 extending axially through the guide portion 73 from the base compartment 76 to the opening 80. A suitable piece of tape 83 is adhesively connected to the annular end surface 78 to cover and seal the opening 80.

As further shown in enlarged detail in FIG. 2, a squib 90 is supported within the actuator housing 70. The squib 90 has a cylindrical casing 92. The casing 92 has a threaded outer surface 94, and has an annular front end surface 96 defining an opening at the front end of the squib 90. A pair of electrically conductive pins 98 extend into the casing 92. The casing 92 contains a pyrotechnic charge 100 in an envelope 102 which is hermetically sealed. The pyrotechnic charge 100 is ignited upon the passage of electric current through the squib 90 between the pins 98. The pyrotechnic charge 100 is preferably $ZrKClO_4$, but other known pyrotechnic charge materials can be used in the squib 90. When the pyrotechnic charge 100 in the squib 90 is ignited, it produces combustion products which rupture the envelope 102 to open the hermetic seal and emerge through the opening at the front end surface 96 of the squib 90.

The casing 92 is screwed into the base compartment 76 of the actuator housing 70 with the opening at the front end surface 96 facing the guide passage 82. The squib 90 is thus supported by the actuator housing 70 in a position to direct the combustion products from the pyrotechnic charge 100 into the guide passage 82 in a direction extending along the axis 61.

Also, as shown in FIG. 2, the actuator assembly 16 further includes a movable container 104 in the form of a projectile member. The movable container 104 has a cylindrical outer side surface 110, an annular rear end surface 112, and a conical front end surface 114. The conical front end surface 114 extends away from the cylindrical outer side surface 110 to form a pointed tip portion 115 of the movable container 104.

The movable container 104 further has a cylindrical inner surface 116 and a circular inner surface 118. The inner surfaces 116 and 118 are coaxial with the outer side surface 110, and together define a compartment 120 within the movable container 104. The compartment 120 has a cylindrical shape, with an open end at the annular rear end surface 112 and a closed end at the circular inner surface 118.

An ignitable material 122 is contained within the compartment 120 in the movable container 104. The ignitable material 122 is preferably $BKNO_3$, but, as with the pyrotechnic charge 100, other known materials can be used as alternatives. The ignitable material 122 fills the compartment 120 and thus has a surface 124 extending across the open end of the compartment 120. The ignitable material 122 (like the ignitable material 100) preferably is protected from environmental conditions such as moisture. Such protection could be accomplished by a cap or a cover in the nature of a shell or possibly a wax coating (none of which are shown in the drawings) which covers the surface 124 at the open end of the compartment.

When the inflator assembly 10 is in the unactuated condition shown in FIG. 1, the movable container 104 is located within the actuator housing 70. Specifically, the movable container 104 has an unactuated position in which it is closely received coaxially within the guide passage 82 in the guide portion 73 of the actuator housing 70. When the movable container 104 is located in its unactuated position, the cylindrical outer side surface 110 of the movable container 104 is closely received against the cylindrical inner surface 79 of the guide portion 73 with a releasable interference fit. The interference fit can be supplemented with a crimp in the guide portion 73 of the actuator housing 70, or with a shear pin or the like. Additionally, the exposed surface 124 of the ignitable material 122 faces axially toward the opening at the front end surface 96 of the squib 90.

The actuator assembly 16 further includes an electrical circuit 150. The electrical circuit 150 includes a power source 152, which is preferably the vehicle battery and/or a capacitor, and a normally open switch 154. The switch 154 is preferably part of a vehicle deceleration sensor 156. The deceleration sensor 156 senses vehicle deceleration of at least a predetermined magnitude which is indicative of a collision, and closes the switch 154 in response to such vehicle deceleration. Such a deceleration sensor is known in the art. The electrical circuit 150 extends through the squib 90 between the pins 98, and actuates the squib 90 when the switch 154 closes.

When the vehicle experiences deceleration of at least the predetermined magnitude indicative of a collision, the deceleration sensor 156 senses the occurrence of such vehicle deceleration and closes the switch 154. When the switch 154 closes, electric current passes through the squib 90 between the pins 98. The pyrotechnic charge 100 in the squib 90 is then ignited, and produces combustion products which rupture the envelope 102 and emerge from the squib 90. The combustion products emerging from the squib 90 move into a space 160 in the guide passage 82 between the squib 90 and the movable container 104, and move axially across the space 160 to the movable container 104. When the combustion products from the squib 90 reach the movable container 104, they ignite the ignitable material 122 in the compartment 120 at the surface 124. The ignitable material 122 then produces combustion products which are emitted from the open end of the compartment 120 and directed into the space 160. Any environmental protection over the surface 124 is destroyed.

When the pyrotechnic charge 100 and the ignitable material 122 are burning, the combustion products are initially contained in the space 160 between the squib 90 and the movable container 104. The gaseous components of the combustion products in the space 160 increase in pressure as the pyrotechnic charge 100 and the ignitable material 122 burn. The squib 90 is securely held in the base compartment 76 by the engaged threads. However, the movable container 104 is releasably held in the guide passage 82 by the interference fit.

When the increasing gas pressure in the space 160 reaches a predetermined elevated level, the force of the gas pressure acting axially against the movable container 104 becomes great enough to overcome the interference fit. The force of the gas pressure then propels the movable container 104 outward of the guide passage 82 from its unactuated position toward the opening 80 at a high velocity. The movable container 104 comprises a mass having an amount of kinetic energy when the movable container 104 is propelled at the high velocity. The kinetic energy of the movable container 104 is sufficient to enable the movable container 104 to break through the tape 83 and move outward through the opening 80 toward the closure wall 46.

The kinetic energy of the movable container 104 is further sufficient to enable the movable container 104 to penetrate and sever a part 170 of the break away portion 58 of the closure wall 46 so as to form a hole 172 through the break away portion 58, as shown in FIGS. 3 and 4. Most preferably, the kinetic energy of the movable container 104 is great enough for the movable container 104 to shear the part 170 from the break away portion 58 so as to puncture the hole 172 in a circular shape. The hole 172 would then have a diameter substantially equal to the diameter of the cylindrical outer surface 110 of the movable container 104.

The hole 172 is a first orifice through which the mixture of gases in the storage chamber 18 exits the storage chamber 18. The mixture of gases flows outward through the first orifice 172 and further through the manifold 40 to the gas flow openings 50. A diffuser 176 with a plurality of gas exit openings 178 then directs the gas to flow from the gas flow openings 50 to the air bag 12.

After the movable container 104 punctures the first orifice 172 through the break away portion 58 of the closure wall 46, the movable container 104 continues to move to the right, as viewed in the drawings, into the storage chamber 18. The movable container 104 thus carries the ignitable material 122, as well as the severed part 170 of the break away portion 58, into the mixture of gases in the storage chamber 18 when the ignitable material 122 is burning. The combustion products generated by the ignitable material 122 include heat, hot particles and hot gases. Those combustion products continue to be emitted from the compartment 120 in the movable container 104 as the movable container 104 moves through the mixture of gases. The combustion products are thus dispersed in the mixture of gases sufficiently to ignite the combustible gas in the mixture substantially uniformly and rapidly throughout the storage chamber 18.

As shown in FIG. 6, the movable container 104 is preferably propelled through the storage chamber 18 along the axis 61 from the closure wall 46 nearly to the second end wall portion 24 of the tank member 15. The ignitable material 122 preferably continues to spew combustion products into the mixture of gases until the movable container 104 reaches the far end of the storage chamber 18. This ensures that the combustible gas in the mixture is ignited uniformly. An optional screen 180 may be included inside the storage chamber 18 adjacent the second end wall portion 24 of the tank member 15. The screen 180 would be punctured by the movable container 104, and would capture the movable container 104 at the far end of the storage chamber 18, as shown in FIG. 6. The screen 180 would also capture the severed part 170 of the break away portion 58 of the closure wall 46 which is carried by the movable container 104.

When the combustible gas burns in the storage chamber 18, it generates heat and gaseous products of combustion which increase the temperature and pressure of the mixture of gases. For example, in a test apparatus including a pressure vessel with a storage chamber like the storage chamber 18, the pressure of the mixture of gases was increased from an initial storage pressure of approximately 2,000–2,500 psi to an elevated pressure of approximately 4,500–5,500 psi.

Although the mixture of gases is already beginning to flow outward from the storage chamber 18 through the first orifice 172 while the pressure is being increased inside the storage chamber 18, the break away portion 58 of the closure wall 46 continues to be subjected to a gas pressure differential between the side surfaces 66 and 68. Accordingly, the gas pressure differential across the break away portion 58 increases in proportion to the increasing pressure inside the storage chamber 18. When the gas pressure differential reaches a predetermined elevated level, the resulting pressure force acting axially outward against the break away portion 58 reaches a corresponding predetermined elevated level. The material of the closure wall 46 which comprises the stress riser interconnecting the break away portion 58 with the rim portion 60, as described above, then ruptures under the stress induced by the pressure force. When the material of the closure wall 46 ruptures, the break away portion 58 is released for movement axially outward from the closure wall 46 and into the manifold 40 under the influence of the gas flowing outward from the storage chamber 18. A second hole 186 through the closure wall 46 is thus formed, as shown in FIG. 5. The second hole 186 has a circular shape and diameter matching the circular shape and diameter of the periphery of the break away portion 58.

The second hole 186 is a second orifice through which gas exits the storage chamber 18. Since the second orifice 186 is substantially larger than the first orifice 172, the flow rate outward through the second orifice 186 is substantially greater than the flow rate at which the gas previously flowed outward through the first orifice 172. Since the flow rate is further increased by the increased pressure attained by the mixture of gases at the time when the second orifice 186 is formed, the mixture of gases which has been pressurized upon burning of the combustible gas rushes quickly outward from the storage chamber 18 to inflate the air bag 12.

Another factor which affects the flow rate outward through the second orifice 186 is the configuration of the surfaces of the closure wall 46 which define the second orifice 186. Specifically, the rim portion 60 of the closure wall 46 has an annular surface 188 which is formed at the ruptured boundary of the break away portion 58. The annular surface 188 defines the outlet area of the second orifice 186. The annular edge 65 of the inner side surface 64, which circumscribes the ruptured boundary of the break away portion 58, also partly defines the second orifice 186. The edge 65 is tapered with its greatest diameter at the planar portion of the inner side surface 64 and its smallest diameter at the annular surface 188. The second orifice 186 thus has a decreasing area as it extends outward from the storage chamber 18. Also, the edge 65 has a rounded radial profile which defines the second orifice 186 as a rounded rather than a square edged orifice. Therefore, the area of the jet of gas emerging from the second orifice 186 is not contracted as it would be if the second orifice 186 were a square edged orifice.

In the preferred embodiment of the invention shown in the drawings, the edge 65 has a rounded shape which results in a coefficient of contraction of approximately 0.97–0.98. In comparison with a square edge orifice, which would have a coefficient of contraction of approximately 0.61, the rounded orifice 186 thus enables a maximum outward flow rate for the mixture of gases which has been pressurized by combustion in the storage chamber 18.

As shown in FIGS. 5 and 6, the break away portion 58 is moved into the manifold 40 when the second orifice 186 is formed. However, the gas flowing outward through the manifold 40 must move through the annular space between the actuator housing 70 and the side wall 44 of the manifold 40. Therefore, it is desirable for the break away portion 58 to block the flow of gas through the manifold 40 as little as possible. The break away portion 58, the actuator housing 70, and the side wall 44 are sized accordingly so that a sufficient annular flow area is provided radially between the peripheral edge 69 of the break away portion 58 and the side wall 44, even if the break away portion 58 moves into the position of maximum blockage shown in FIG. 5. That annular flow area is greater than the outlet area of the second orifice 186, so that the second orifice 186 is the controlling orifice. For example, an annular flow area of 0.266 sq. in. surrounding a break away portion 58 with an outer diameter of 0.470 in. is found to be sufficient for a second orifice 186 with an outlet area of 0.173 sq. in.

The performance of the inflator assembly 10 can be controlled in a number of different ways. For example, the amounts and compositions of the pyrotechnic charge 100 in the squib 90 and the ignitable material 122 in the movable container 104 are variables that determine the rate at which the pressure will increase in the space 160 between the squib 90 and the movable container 104. The rate at which the pressure increases in the space 160 will affect the time at which and the speed with which the movable container 104 enters the storage chamber 18. The speed with which the movable container 104 moves through the mixture of gases, and the amount of the ignitable material 122 which continues to burn as the movable container 104 moves through the mixture of gases will, in turn, affect the amount of and rate at which the combustion products are dispersed in the mixture of gases to ignite the combustible gas in the mixture.

An additional feature affecting the performance of the inflator assembly 10 is the shape of the storage chamber 18. Since the combustible gas is burned in the storage chamber 18 to increase the pressure of the mixture of gases inside the storage chamber 18, the storage chamber 18 serves also as a combustion chamber. The mixture of gases will be pressurized most efficiently when the combustion occurs uniformly throughout the mixture of gases. Therefore, the shape of the storage chamber 18 is designed to promote combustion uniformly throughout the entire volume of the storage chamber 18.

In the first embodiment of the invention shown in FIG. 1, the pressure vessel 14 defines the storage chamber 18 in a substantially cylindrical shape with a diameter d and a length L. Specifically, the cylindrical side wall portion 22 of the tank member 15 defines the diameter d. The length L is defined between the first and second end wall portions 22 and 24 of the tank member 15. The length L could vary somewhat due to a slight curvature of the end wall portions 22 and 24 and/or due to a slight axial offset between the first end wall portion 22 and the closure wall 46. However, such structural details of the pressure vessel 14 would not cause the storage chamber 18 to vary significantly from a cylindrical shape with a volume defined by the diameter d and the length L.

Applicant has found that the combustion of the combustible gas in the storage chamber 18 occurs most efficiently when the dimensions of the storage chamber 18 are such that the value of the ratio of L to d is within the range of 0.75–1.25. Moreover, the efficiency of the combustion is found to increase further as the value of the ratio of L to d approaches an optimum value of 1.0. Therefore, the value of the ratio of L to d in the first embodiment of the invention shown in FIG. 1 is equal to 1.0. The combustion efficiency of the storage chamber 18 is thus maximized.

For example, in a test apparatus, a cylindrical storage chamber with an L to d ratio of 1.0 was filled with a combustible mixture of gases at an initial storage pressure of approximately 2,500 psi. The combustible gas in the mixture comprised hydrogen at a contributing partial pressure of approximately 12–13 percent of the total initial storage pressure. After the test apparatus was actuated to further pressurize and release the mixture of gases from the storage chamber, as described above with reference to the inflator assembly 10, the pressure inside the storage chamber returned to the level of the ambient atmospheric pressure. At that time the residual contributing partial pressure of the hydrogen was measured at a level of approximately 2 percent. The contributing partial pressure of the hydrogen was thus reduced to a level below approximately 4 percent, which is the minimum ignitable level of hydrogen in air at atmospheric pressure. The combustion which occurs in accordance with the present invention is thus efficient enough to continue consuming hydrogen after the amount of hydrogen falls below the amount that is ordinarily expected to support combustion. Such efficiency has not been achieved in a test apparatus having a cylindrical storage chamber with an L to d ratio outside the range of 0.75–1.25. Therefore, a relatively greater percentage of the combustible gas is consumed in the storage chamber 18. As a result, the mixture of gases in the storage chamber 18 requires a lesser initial quantity of combustible gas, and/or a lower initial storage pressure, to inflate the air bag 12 at a given rate.

An inflator assembly 200 comprising a second embodiment of the present invention is shown in FIG. 7. As set out in the foregoing description of the first embodiment of the present invention, an increase in combustion efficiency in the storage chamber 18 is found to result from a decrease in the elongation of the storage chamber 18. Therefore, the inflator assembly 200 includes a pressure vessel 222 with a storage chamber 224 that is shaped substantially as a sphere, i.e., without elongation.

Other elements of the inflator assembly 200 are the same as the corresponding elements of the inflator assembly 10 described above, as indicated by the same reference numbers used in FIG. 7. The inflator assembly 200 thus includes a movable container 104. The movable container 104 contains and ignitable material 122, and is propelled through the storage chamber 224 along an axis 61 from a closure wall 46 at the outer end of the storage chamber 224 to a screen 180 adjacent to the inner end of the storage chamber 224. Since the storage chamber 224 is spherical, the distance between the inner and outer ends of the storage chamber 224 is equal to the diameter of the storage chamber 224. As a result, the combustible gas in the mixture of gases contained in the storage chamber 224 is ignited quickly and uniformly throughout the entire volume of the storage chamber 224 when combustion products are spewed into the storage chamber 224 from the ignitable material 122 in the movable container 104.

In each of the preferred embodiments of the invention described above, the combustible gas is ignited by products of combustion that are dispersed throughout the mixture of gases as a movable container is propelled through the mixture of gases. However, the present invention is not limited to such a means for igniting the combustible gas. For example, the combustible gas could alternatively be ignited by a squib or other igniter located inside the storage chamber with the combustible mixture of gases. Nor is the present invention limited to the use of an actuator assembly and a closure wall like the actuator assemblies 16 and closure walls 46 described above. Instead, a pressure vessel having a storage chamber constructed in accordance with the present invention can be opened by any other suitable means, either before or after the combustible mixture of gases is ignited inside the storage chamber. For example, a pressure vessel having a storage chamber constructed in accordance with the present invention can include a conventional burst disk which maintains the pressure vessel in a closed condition. The burst disk could be ruptured by a projectile, such as a projectile like the movable container 104. Alternatively, the burst disk could be used with an igniter located inside the storage chamber. With such an arrangement, when the increasing gas pressure inside the storage chamber reaches a predetermined elevated level, it would rupture the burst disk. Such a burst disk could be designed to rupture along predetermined score lines or the like, as known in the art.

From the foregoing description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. Apparatus for inflating an inflatable vehicle occupant restraint, said apparatus comprising:

pressure vessel means for defining a storage chamber for containing a combustible mixture of gases, said storage chamber having an axis, first and second opposite ends which are spaced from each other a distance along said axis, and a substantially circular cross sectional shape at all locations along said axis, the ratio of said distance to the greatest cross sectional diameter of said storage chamber being within the range of 0.75–1.25;

a combustible mixture of gases in said storage chamber;

igniter means for igniting said combustible mixture of gases in said storage chamber;

directing means for directing gas to flow from said pressure vessel means into the vehicle occupant restraint; and actuator means for opening said storage chamber to release said combustible mixture of gases to flow outward from said storage chamber before said combustible mixture of gases is ignited;

said actuator means including said igniter means, said igniter means including an ignitable material which, when burning, emits combustion products for igniting said combustible mixture of gases, said actuator means further including means for igniting said ignitable material and for moving said ignitable material through said combustible mixture of gases in said storage chamber when said ignitable material is burning.

2. Apparatus as defined in claim 1 wherein said actuator means includes a movable container which contains said ignitable material, said actuator means moving said movable container from said first end of said storage chamber to an inner location spaced from said first end when said ignitable material is burning.

3. Apparatus as defined in claim 2 wherein said actuator means moves said movable container into said storage chamber when said ignitable material is burning.

4. Apparatus for inflating an inflatable vehicle occupant restraint, said apparatus comprising:

pressure vessel means for defining a storage chamber for containing a combustible mixture of gases;

a combustible mixture of gases contained under pressure in said storage chamber in an unignited, homogeneous gaseous state, said combustible mixture of gases comprising a primary gas and a combustible gas, said primary gas including an inert gas for inflating the vehicle occupant restraint, said primary gas further including an oxidizer gas for supporting combustion of said combustible gas;

igniter means for igniting said combustible mixture of gases in said storage chamber; and directing means for directing gas to flow from said pressure vessel means into the vehicle occupant restraint;

said storage chamber having an axis, first and second opposite ends which are spaced from each other a distance along said axis, and a substantially circular cross sectional shape at all locations along said axis, the ratio of said distance to the greatest cross sectional diameter of said storage chamber being within the range of 0.75–1.25, whereby said pressure vessel means promotes combustion of said combustible mixture of gases uniformly throughout the entire volume of said storage chamber.

5. Apparatus as defined in claim 4 wherein said storage chamber has a substantially cylindrical shape with a length between said opposite ends and a substantially constant diameter along said length.

6. Apparatus as defined in claim 5 wherein said length is substantially equal to said diameter.

7. Apparatus as defined in claim 4 wherein the diameter of said storage chamber varies continuously along said axis between said opposite ends.

8. Apparatus as defined in claim 7 wherein said storage chamber is shaped substantially as a sphere, said distance between said opposite ends of said storage chamber thus being equal to the diameter of said sphere.

9. Apparatus as defined in claim 4 further including actuator means for opening said storage chamber to release said combustible mixture of gases to flow outward from said storage chamber toward said directing means before said combustible mixture of gases is ignited.

10. Apparatus as defined in claim 4 wherein said igniter means includes a solid ignitable material which, when burning, emits combustion products for igniting said combustible mixture of gases, said apparatus further including actuator means for igniting said ignitable material and for moving said ignitable material through said combustible mixture of gases in said storage chamber when said ignitable material is burning.

11. Apparatus as defined in claim 10 wherein said actuator means includes a movable container which contains said ignitable material, said actuator means moving said movable container within said storage chamber when said ignitable material is burning.

12. Apparatus as defined in claim 11 wherein said actuator means moves said movable container into said storage chamber when said ignitable material is burning.

13. Apparatus as defined in claim 4 further comprising sensing means for sensing the occurrence of vehicle deceleration of at least a predetermined magnitude indicative of a vehicle collision, said igniter means being responsive to said sensing means.

* * * * *